United States Patent [19]

Dunckhorst

[11] 4,345,621

[45] Aug. 24, 1982

[54] TIMED SHOWER HEAD VALVE

[76] Inventor: William H. Dunckhorst, P.O. Box 32, South Lake Tahoe, Calif. 95705

[21] Appl. No.: 230,209

[22] Filed: Feb. 2, 1981

Related U.S. Application Data

[63] Continuation-in-part of Ser. No. 64,532, Aug. 5, 1979, Pat. No. 4,282,899, which is a continuation-in-part of Ser. No. 843,825, Oct. 20, 1977, abandoned.

[51] Int. Cl.$^3$ .................. B05B 1/30; F16K 31/48
[52] U.S. Cl. ..................... 137/624.12; 239/70
[58] Field of Search ............... 137/624.11, 624.12, 137/599; 239/70; 251/315

[56] References Cited

U.S. PATENT DOCUMENTS

| | | | |
|---|---|---|---|
| 2,098,815 | 11/1937 | Van Veen | 137/624.11 |
| 3,272,473 | 9/1966 | Veit | 251/315 X |
| 3,893,469 | 7/1975 | Baker | 251/315 X |
| 4,230,155 | 10/1980 | Frye | 239/70 X |

*Primary Examiner*—Alan Cohan
*Attorney, Agent, or Firm*—Howard I. Podell

[57] ABSTRACT

A shower head valve assembly for saving on the amount of water used for a single shower, which provides a timed cycle allowing water to flow for a preset period. The assembly includes a rotating ball set in a valve chamber. The ball is grooved and ported to control the flow of water. Rotation of the ball is controlled by a manually set spring operated timer which is wound to set to the timer and valve in operation.

4 Claims, 6 Drawing Figures

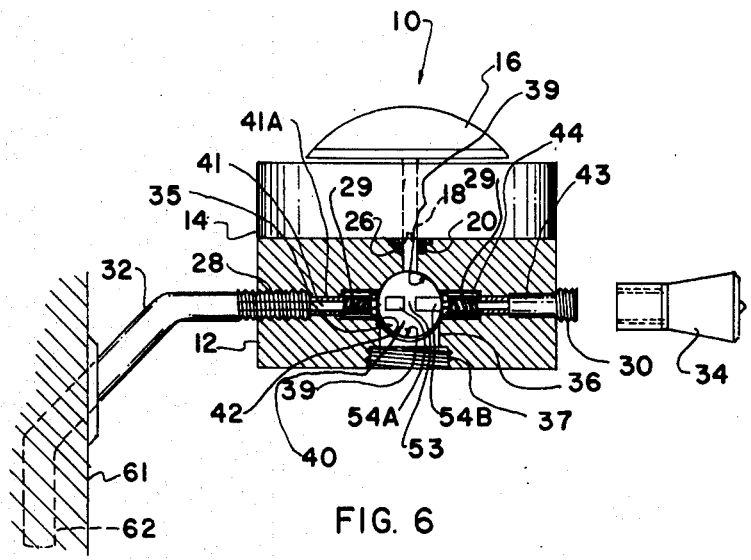
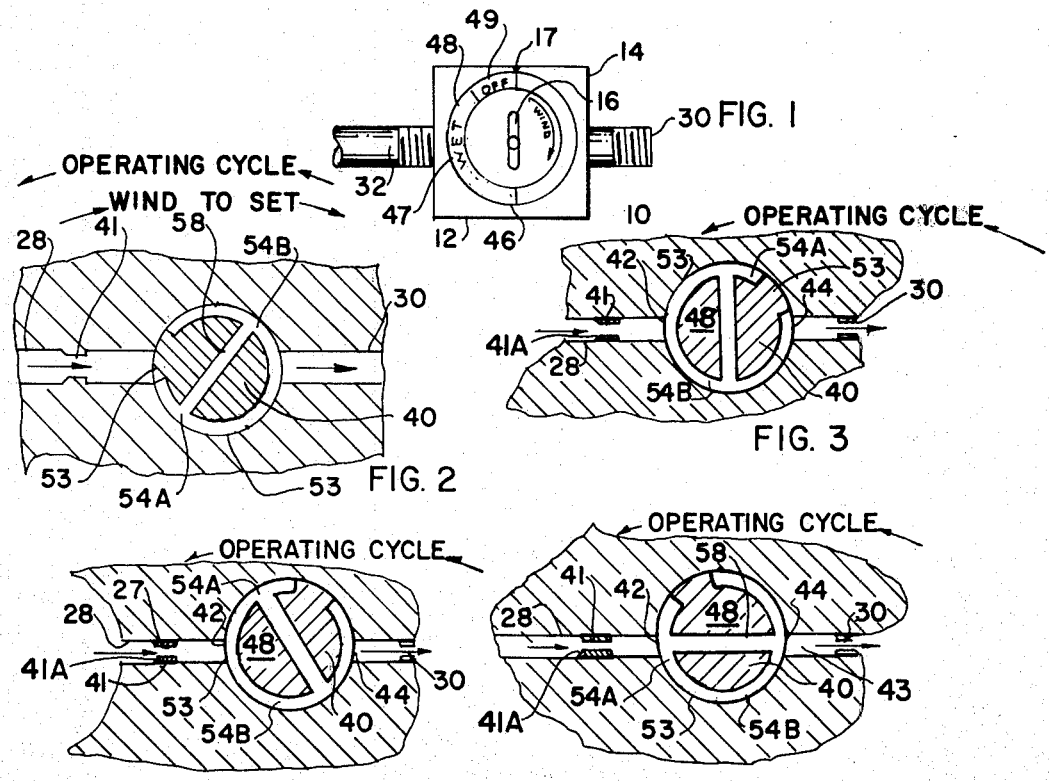

TIMED SHOWER HEAD VALVE

This application is a continuation-in-part of pending application Ser. No. 64,532 filed on 8-5-1979, and which is a continuation-in-part of application Ser. No. 843,825 filed Oct. 20, 1977, which original application had been abandoned after filing of the application Ser. No. 64,532. Application Ser. No. 64,532 has issued on Aug. 11, 1981 as U.S. Pat. No. 4,282,899.

FIELD OF THE INVENTION

This invention relates generally to a timed shower head valve assembly for saving water and intended for use where water is scarce.

STATEMENT OF PRIOR ART

The prior art, as exemplified by U.S. Pat. Nos. 2,098,815; 2,877,467; 2,710,162; 2,030,451; 2,660,396; 2,985,193; 2,935,092; and 2,808,882 and German patent 1,450,552 is generally illustrative of various devices of this type. While such devices are generally acceptable for their intended purpose they have not proven to be entirely satisfactory in that they are either complex and expensive to manufacture, or bulky and inconvenient to use or to operate. As a result of the shortcomings of the prior art, typified by the above, there has developed and continues to exist a substantial need for devices of the character described. Despite this need, and the efforts of many individuals and companies to develop such devices, a satisfactory device meeting this need has heretofore been unavailable.

The principal object of this invention is to provide a device or article of this character which combines simplicity, strength and durability in a high degree, together with inexpensiveness of construction.

Other objects of this invention will in part be obvious and in part hereinafter pointed out.

The invention accordingly consists in the features of construction, combinations of elements, and arrangement of parts which will be exemplified in the construction hereinafter described, and of which the scope of application will be indicated in the following claims.

SUMMARY OF THE INVENTION

This invention is intended to be installed in the exposed pipe leading to a shower head assembly for saving on the amount of water used for a single shower and provides a timed cycle allowing water to flow on for a pre-set period time. The assembly includes a rotating ball valve set in a valve housing. The ball is grooved and ported to control the flow of water. Rotation of the ball is controlled by a manually set spring operated timer which is wound to set the timer and valve in operation.

BRIEF DESCRIPTION OF THE DRAWING

In the accompanying drawings, in which is shown one of the various possible illustrative embodiments of this invention, wherein like reference character identify the same or like parts:

FIG. 1 is a plan view of the valve illustrating the timer dial face;

FIG. 2 is a schematic view of the ball valve in the initial and final (OFF) position;

FIG. 3 is a schematic sectional view of the ball valve initially rotated to the start WET (ON) position;

FIG. 4 is a schematic sectional view of the ball valve after it has rotated initially from the start (ON) position; and FIG. 5 is a schematic sectional view of the ball valve after it has further rotated towards the final (OFF) position;

FIG. 6 is a side partially sectional view of the valve assembly.

DESCRIPTION OF THE PREFERRED EMBODIMENT

With reference to the drawings, there is shown and illustrated a novel shower assembly constructed in accordance with the principles of the invention and designated generally by reference character 10. The particular device represented includes a valve housing 12 on which is affixed by suitable means of mechanical rotatable timer and housing 14 of known construction. The timer 14 is of the manually wound spring operated type similar to those employed as kitchen or oven timers. It includes a setting knob 16 keyed on shaft 18 rotatable against an internal timer spring (not shown) and an internal clock movement (not shown) which is designed to unwind shaft 18 at a constant rate over a period of time, each time the knob is turned on to the start WET position. The inner end of shaft 18 is keyed to engage with the valve shaft 20 in only one specific aligned position. An "O" ring seal 26 is mounted on the ball valve shaft 20. Knob 16 is marked with individual arcuate sections 46, 49 that individually indicate against fixed index mark 17 on the face of housing 14, the status of the valve in operation. Internal stops prevent shaft 18 from being manually rotated clockwise in winding beyond the segment 46 marked WET, and prevent shaft 18 from unwinding counterclockwise beyond the segment 49 marked OFF, with such segments registering with index mark 17 in such limiting positions.

Housing 12 is provided with a female threaded inlet 28 and a male threaded outlet pipe 30, preferably each of one-half inch pipe size so as to receive inlet water conduit 32 and shower head 34 respectively. It will thus be seen that this invention can either be readily retrofitted on existing shower installations or installed on new shower assemblies. Housing 12 is also provided with a central recess 35 the closed end 39 of which is closely contoured to match the shape of the top half of the generally spherical ball valve member 40. The ball valve is secured in recess 35 by a shaped retainer 36 held in place by threaded plug 37. The internal face of retainer 36 is of a spherical section and is fitted with a gasket seal 39 to bear slidably against the underside of ball valve member 40.

Inlet 28 communicates through passageway 41 to inlet port 42 and outlet pipe 30 is fixed so as to communicate through passageway 43 to outlet port 44. A seal 45 in each port 42 and 43 is held in place by a spring 29 to bear against ball valve member 40 so as to seal flow of water in either port from flowing to the other port about the exterior of ball valve member through recess 35 except as hereinafter described. Preferably inlet ports 42 and 44 extend along a common axis and are spaced one-hundred-eighty degrees from each other with relation to ball valve member 40.

Ball valve member 40 is formed with a ball 48 shaped with a segment of a peripheral groove 54 recessed from the exterior surface, and terminating at each end in a solid section 53 of the ball. The groove 54 is connected by a diametral internal port 58 drilled through the ball between the grooves. Groove 54 preferably extends for a peripheral sector of more than two hundred seventy degrees about ball member 40, with the axis of the groove lying in a plane which intersects the axes of ports 42 and 44.

Water will flow from port 42 to port 44 when, as shown in FIG. 3, ball valve member 40 is rotated to the initial start WET position with groove 54 extending from port 42 to port 44. Under rotatable positions of ball valve member 40 other than at the initial and final position of FIG. 2, the solid external spherical surface of the ball valve member will completely block direct flow of water between the blocked ends of groove 54, but water will flow through the unblocked section of the groove and through passage 58.

As shown in FIG. 1, the timing mechanism is wound less than one-hundred-eighty degrees clockwise by manual rotation of knob 16 to an internal mechanical stop fixed (not shown) and, upon release, the internal spring of the timer rotates the ball valve member 40 counterclockwise back to the start position FIG. 2.

As the timer clock mechanism unwinds, the timer dial 16 and the ball valve 40 member rotate through an arc of travel to permit the flow of water through the shower. Thus when timing dial 16 is initially turned to the start WET position, shown in FIG. 3, the ball valve groove 54 extends from the inlet and outlet ports 42, 44. This groove 54 is aligned with both ports, for an arc of travel of the ball valve member corresponding to approximately four minutes of time, allowing water to flow to the shower head 34 for this preferral washing period. As the ball valve 40 rotates further the solid segment 53 of the ball valve passes to block the inlet port 42, stopping the flow of water to the shower head 34, to automatically end the shower cycle. All or part of the shower cycle can be repeated, if desired, by manual resetting the dial 16 to an appropriate intermediate position and releasing.

The water passageway 41 between inlet 28 and inlet port 42 is restricted in size by the internal opening of replaceable tube 41A to limit the water flow to the shower head 34 during the wetting period, as desired.

The use of the present invention will cut down water consumption for one shower from an average of twenty-five gallons to about less than six gallons because of the restricted size of the inlet water passageway 41 and the automatic timing of the water flow during the wetting period.

The inlet water conduit 32 is conventionally joined to a pipe 62 behind the wall 61 of the shower stall, which pipe leads to conventional valves behind the wall for regulating the flow of hot and cold water to conduit 32. This invention may be installed in a new installation behind wall 61 on pipe 62, with shaft 18 and knob 16 projecting externally of the wall. However the simplicity of mounting the invention 10 as shown externally to shower conduit 32 provides for ready installation and maintenance, and permits replacement of the tube 41A when it is desired to change the internal size of restricted passageway 41 to meet current conservation requirements.

The operation and use of the invention hereinabove described will be evident to those skilled in the art to which it relates from a consideration of the foregoing.

It will thus be seen that there is provided a device in which the several objects of this invention are achieved, and which is well adapted to meet the conditions of practical use. Its advantages are easily seen.

It is thought that persons skilled in the art to which this invention relates will be able to obtain a clear understanding of the invention after considering the foregoing description in connection with the accompanying drawing. Therefore, a more lengthy description is deemed unnecessary.

It is to be understood that various changes in shape, size and arrangement of the elements of this invention as claimed may be resorted to in actual practice, if desired.

Having thus described the invention, what is claimed as new and to be secured by Letters Patent is:

1. A valve assembly adaptable for mounting on a conduit leading to a bath shower head so as to conserve the amount of water employed for a complete shower in one cycle of operation of said assembly, by control of the time period of flow of water through said shower head, so as to provide timed period of water flow during one cycle of operation, in which the assembly comprises a valve housing a clock timer device mounted to said valve housing and fitted with a rotatable shaft, said clock timer incorporating spring clock work mechanism to cause said shaft to rotate, at a uniform velocity in a second direction for a circular angular sector generally equal to the circular angular sector that said shaft has been initially rotated manually in a first direction, with a first end of said shaft attachable externally to a knob, a circular valve member rotatably mounted in an interior chamber in said valve housing and attached to said shaft, an interior chamber of a shape to fit about the circular perimeter of said valve housing, an internal inlet port and an internal outlet port in said valve housing each joining said interior chamber by an individual passageway to an external inlet port and an external outlet port respectively, a groove recessed in the circular perimeter of the valve member, with the axis of the groove lying substantially in a plane that intersects the axes of both internal inlet and outlet ports, said plane being substantially perpendicular to the axis of the rotatable shaft of the clock timer, and with each of two opposed ends of the groove separated from each other along the periphery of the valve member by a non-recessed section of the valve member periphery, where said non-recessed section extends along an angular sector, in said common plane, so as to completely block an internal inlet port or internal outlet port when said non-recessed section is aligned with said internal port, a through passageway in said valve member joined at each opposed end to a section of the groove, said groove and said non-recessed section located so that in the initial and final position of the valve member, recessed section completely blocks one internal port, in a second position of the valve member, the recessed groove extends completely to both internal ports so as to permit water flow through said groove, and through said through passageway, said initial and final position being a position that the valve member is rotated to, in a second direction by the timer shaft after the timer shaft has been rotated manually in the first direction, opposed to said second direction, from the said initial and final position to the said second position.

2. The combination as recited in claim 1, in which the valve member is of a substantially spherical shape and mounted in a substantially spherical shaped chamber in the valve housing.

3. The combination as recited in claim 1 together with at least one tube which may be detachably mounted in an individual passageway joining an internal port of the assembly to an external port of the assembly, said tube formed with an internal through restricted bore of a particular size such that the maximum amount of water flowing through the valve assembly in one cycle of operation of a specific time will be dependent upon the particular restricted size of the said through bore of the tube, for uniform water supply such that the maximum amount of water flowing through the assembly in one cycle of operation for said specific time may be varied, as desired, by removing said detachable tube and replacing it with a second such detachable tube of a different size of restricted bore.

4. The combination as recited in claim 2, in which a first section of the said spherical chamber is bounded by a first recessed section of the housing that is formed with a countour to closely match the shape of substantially half of the said valve member, and in which a second section of the said chamber is bounded by a retainer, the internal face of which is of the contour of a generally shaped spherical section, together with threaded means to hold the retainer in place against said valve member.

* * * * *